March 22, 1960 T. R. KOMLINE 2,929,507
SELF-CLEANING FILTER
Filed Jan. 22, 1957
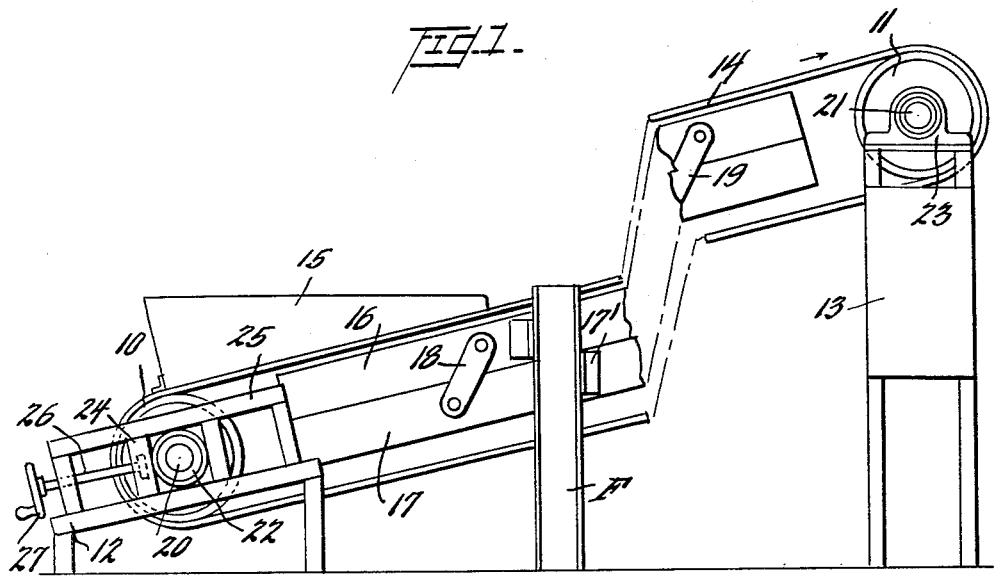
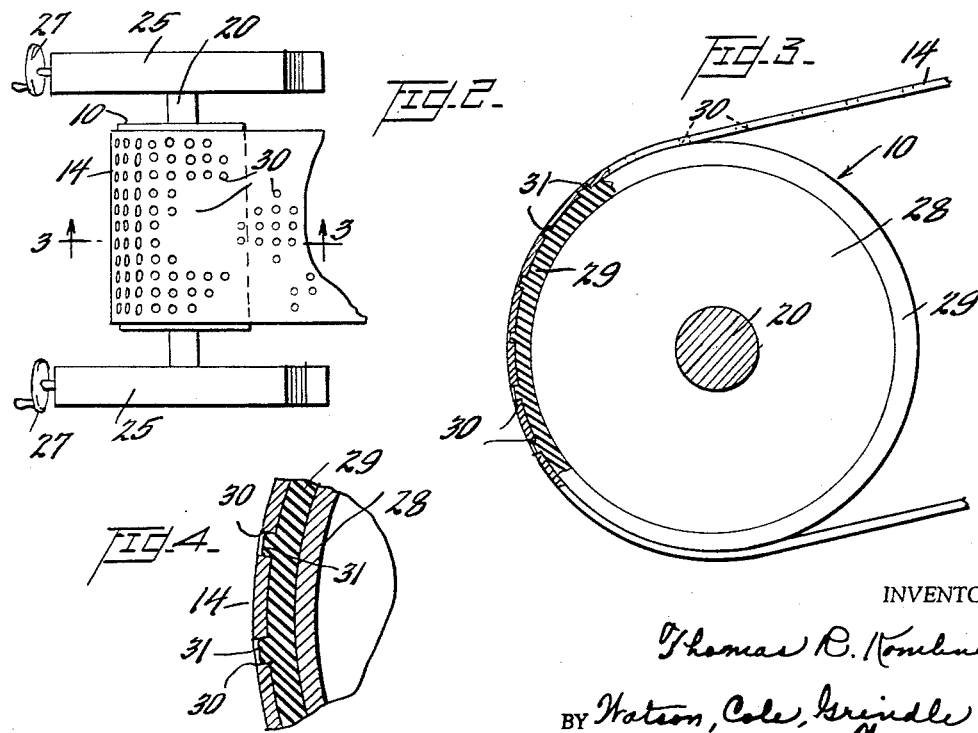
INVENTOR
Thomas R. Komline
BY Watson, Cole, Grindle & Watson
ATTORNEY United States Patent Office 2,929,507
Patented Mar. 22, 1960

2,929,507

SELF-CLEANING FILTER

Thomas R. Komline, Gladstone, N.J., assignor to Komline-Sanderson Engineering Corporation, Peapack, N.J., a corporation of New Jersey Application January 22, 1957, Serial No. 635,175

6 Claims. (Cl. 210—400)

This invention relates to liquid filtering apparatus of the class in which a flexible filter media travels through an endless circuit to perform a continuous filtering function.

Apparatus of this type is frequently employed for separating solid materials from a mixture of solids and liquids, the liquids being generally, though not necessarily, forced through the filter media by suction or pressure. In the use of such apparatus it will be apparent that the solid matter which is separated out from the liquid becomes coated on the filter media as a filter cake and also tends to enter and clog the perforations or pores in the filter media so that this solid material must be more or less continuously removed in order to maintain the efficiency of the filter.

Removal of the main portion of the filter cake may be accomplished in large part by flexing of the filter media as it passes around one of its supporting drums or rollers. However, in order to remove the solid materials from the filter pores or passages it has been necessary to utilize supplementary cleaning means. Among the supplementary cleaning means heretofore employed have been brushes and fluid jets or spray heads. It has been found difficult to accomplish an efficient cleaning of the pores or apertures with brushes in view of the difficulty of getting the bristles of the brushes to penetrate these apertures. Where water sprays or jets are used for this purpose the cleaning is more efficient but the amount of water thus employed may be considerable and uneconomical. Moreover, in hard water regions a scale may be built up on the filter media that adversely affects the operation of the filter, to say nothing of the fact that such water sprays, brushes and the like comprise extraneous items of equipment and structure in addition to the rollers or drums around which the filter media is normally guided, and thus may be regarded as uneconomical.

It is accordingly a primary object of the invention to so form one or more of the rollers which support the filter media and to so tension the filter media around this roller that the filter media and the roller cooperate to thoroughly clean the filtering apertures as an incident to the passage of the filter media around the roller. It is a further object to attain a positive mechanical ejection of the solids from the filtering apertures of the filter media or belt as the latter passes around the drum or roller.

For the attainment of these objectives, one or more of the rollers around which the filter media is passed is provided with an outer layer or facing of a relatively soft elastically deformable material, such as soft rubber, and the filter media in the form of a belt is maintained under such tension that as it passes around the outer rubber layer of the roller the soft elastic material thereof will be squeezed or extruded into the apertures in the form of protuberances which will force out any solid material and which will, of course, be withdrawn as the belt leaves the roller.

The foregoing objects and advantages are attained by the preferred embodiment of the invention illustrated in the accompanying drawings in which:

Figure 1 represents a side elevation (medially broken away) of an endless belt type filtering unit embodying the features of the invention.

Figure 2 is a fragmentary plan view of the lower end portion of the unit shown in Figure 1.

Figure 3 is an enlarged section on the line 3—3 of Figure 2, and

Figure 4 is a greatly enlarged fragmentary section taken in the same plane as Figure 3, showing the manner in which the rubber layer or coating of the roller cooperates with the filter belt.

Referring now in detail to the accompanying drawings, the apparatus shown in Figure 1 is of the general class disclosed in the co-pending application of Thomas R. Komline Serial No. 552,325. In such apparatus a pair of relatively spaced rollers 10 and 11 are rotatably supported in rigid frame portions 12 and 13 and having a filter media in the form of a multi-perforated or porous endless belt 14 disposed therearound for movement in an endless circuit responsive to rotation of the rollers. Obviously, rotation may be imparted to either of the rollers in any suitable manner to cause movement of the upper run of the belt 14 from its lower end to its upper end as indicated by the arrow in Figure 1.

A liquid-containing hopper 15 supported over the lower end of the upper run of the belt 14 and having its lower edges in generally fluid-tight sliding engagement therewith exemplifies any means for continuously depositing a mixture of liquid and solid material on the upper run of the belt 14. If desired, the passage of the liquid through the perforated belt 14 may be expedited by means of suction boxes, not shown, carried by the frame 16 for vertical movement into and from operative engagement with the under surface of the upper run of the belt 14. In the form shown and as is disclosed in detail in the co-pending application above mentioned, such vertical movement may be caused by relatively moving the two parallel frames 16 and 17 in the direction of their lengths or, in other words, parallel to the upper run of the belt 14 whereby the diagonal toggle links, such as 18 and 19 interconnecting them will produce the desired movement. Such movement may be limited by stops 16' and 17' on the respective frames engaging the vertical frame element F shown in Figure 1.

The frame 16 will normally be raised to engage its suction box or boxes with the under side of the upper belt run as above mentioned, and the belt 14 may be driven either continuously or intermittently, in accordance with the disclosure of the above mentioned application.

The foregoing general construction and arrangement constitutes no part of the instant invention and is merely described in order to promote a clear understanding of the invention and its environment. Obviously the frames 16 and 17, together with their associated suction boxes in the form described, are not essential.

It will be seen that the opposed rollers 10 and 11 have their shafts 20 and 21 rotatably supported in bearings 22 and 23, respectively carried by the frames 12 and 13. At least one of these bearings 22 in the present embodiment is adjustable to exert the proper working tension on the filter belt 14. To this end the bearing 22 is carried by a slide 24 movable in guideways 25 generally lengthwise of the belt. Adjustment of this slide 24 is accomplished through any conventional means as, for instance, the threaded shaft 26 having a hand wheel 27 on its outer end. Shaft 26 is threaded through the end member of the guide way or guide frame 25 and has its inner end rotatably connected to the slide 24 to cause movement of the latter along the guide way 25. Obviously two such bearings are provided for each roller as well as two adjusting means for the roller 10.

Rollers 10 and 11 may be of identical construction; accordingly, the detailed views of the roller 10 shown in Figures 3 and 4 will also illustrate the construction of the roller 11. Roller 10 in the preferred embodiment comprises a metal cylinder which may, if desired, be of hollow construction. This cylinder is mounted on the shaft 20 for rotation about the axis of the shaft. Cemented, or otherwise suitably secured on the outer cylindrical face of the cylinder 28, is a cylindrical layer 29 of uniform thickness consisting of resiliently deformable material such as soft rubber. As is best shown in Figures 3 and 4, this material is of a softness and is deformably resilient to such an extent that as the tensioned filter belt 14 is drawn around it the squeezing action of the belt will cause the rubber layer 29 to "flow" or be temporarily extruded into the respective pores or apertures 30 of the belt in the form of protrusions 31. It will be seen that these protrusions, by virtue of their movement into and at least partially through the respective apertures, will function to positively eject from them any solids which may have accumulated therein.

The filter belt 14 is preferably of a comparatively thin sheet of flexible metal the openings 30 through which are suitably spaced and arranged for cooperation with the rubber layer 29. In the present drawings the thickness of the belt 14 and the size of the perforations therein is purposely exaggerated in order to better illustrate the principle of the invention.

In accordance with one operative embodiment of the invention the perforations 30 will be of a diameter ranging between 15- and 20-thousandths of an inch and will be relatively spaced from ⅛th to ³⁄₁₆th of an inch between centers. The rubber layer 29 on the rollers, as above mentioned, is a soft resilient rubber and in the preferred embodiment it has been found that rubber of approximately 10 durometer in hardness will function quite efficiently with such a belt. The thickness of the rubber may vary as desired and it is, of course, not essential from a production standpoint that the rubber be in the form of a coating, as obviously the entire roller 10 or 11 may be formed of rubber supported on a shaft 20 or 21.

Obviously only one such roller need be utilized and this may be at any convenient point not necessarily as illustrated in the drawings, so long as provision is made for tensioning the belt around such roller to achieve the desired squeezing or extruding effect, such as will cause protuberances in the rubber to project into the belt apertures to positively eject solids from these apertures or perforations.

In the operation of the filtering unit it is believed to be apparent from the foregoing description that the mixture of liquids and solids to be filtered is maintained in or constantly supplied to the hopper 15 in any suitable manner and since the upper run of the belt 14 in effect defines the bottom of the hopper, the movement of the upper run from left to right as seen in Figure 1 will cause such mixture of liquids and solids to be deposited as a coating on the belt. During the movement of the belt from the lower roller 10 to the upper roller 11 the liquid material will be progressively strained through the several apertures or pores 30 in the belt. Such action may be clearly expedited by the use of the suction boxes such as above mentioned and as is known in the art, so that by the time the material reaches the roller 11 the solid material remaining on the belt 14 will be in the form of a filter cake which will be largely broken away and removed by flexing of the belt 14 as it passes around the roller 11. It will be seen then that any solid material remaining in the apertures or openings 30 in the belt will be positively ejected by the protrusions 31 of the resilient layer 29 as the belt passes around the two rollers 10 and 11 prior to commencing its next operative filtering run.

In this application there is shown and described only the preferred embodiment of the invention merely in order to illustrate the best method contemplated for carrying out the invention. However, it will be appreciated that the invention may be incorporated in various structures other than that shown and also that the details of the structure shown in the accompanying drawings may be modified in various ways. Accordingly, the drawings and description herein are intended as merely illustrative in nature and not as restrictive.

Having thus described the invention, I claim:

1. A self-cleaning filter comprising a multi-perforated flexible metal filter belt, a plurality of rollers guiding said belt for movement through an endless circuit, means for relatively adjusting said rollers to apply tension to said belt, said rollers respectively having outer coatings of resiliently deformable soft rubber engaging said belt, the rollers being adjusted to apply to the belt a degree of tension such as will force the resilient material of said coatings to flow progressively into said perforations of the belt incident to rotation of the rollers to form protuberances for ejecting solid materials from said perforations, the perforations of said belt being unobstructed on the side thereof opposite said rollers throughout the area of contact between said belt and each of said rollers.

2. The combination of claim 1 wherein said belt has an upwardly presented run, and including means for deliverying a mixture of liquids and solids onto said run.

3. A self-cleaning filter comprising a multi-perforated flexible filter belt, means including a roller guiding said belt for movement through an endless circuit, a soft outwardly presented portion of resiliently deformable material on said roller engaging said belt, and means tensioning the belt around said roller to such degree as to cause said resiliently deformable material to progressively flow into the perforations of said belt in the form of protuberances which function to clear said perforations, the perforations of said belt on the side thereof remote from the roller being completely unobstructed throughout the passage of said belt around the roller.

4. The combination of claim 3 wherein the roller comprises a relatively hard core around which said soft outwardly presented portion of resiliently deformable material is disposed, whereby said material will be compressed between said belt and said hard core and thus will in effect be extruded into and partially through said perforations.

5. A self-cleaning filter comprising a roller formed with a soft outwardly presented layer of resiliently deformable material, a perforated flexible filter belt guided for movement around said roller in engagement with said layer, and means tensioning the belt around said roller to such degree as to squeeze said deformable material into said perforations for ejecting foreign matter from the perforations, the perforations of said belt on the side thereof remote from the roller being completely unobstructed throughout the passage of said belt around the roller.

6. The combination of claim 5 wherein said roller includes a hard core encased concentrically within said outwardly presented layer.

References Cited in the file of this patent

UNITED STATES PATENTS

| | | |
|---|---|---|
| 620,786 | Koerper et al. | Mar. 7, 1899 |
| 636,762 | Conley | Nov. 14, 1899 |
| 1,201,021 | Callow | Oct. 10, 1916 |
| 1,285,448 | Spooner | Nov. 19, 1918 |
| 2,153,688 | Fitzgerald | Apr. 11, 1939 |
| 2,220,985 | Wilson | Nov. 12, 1940 |
| 2,327,226 | Taylor | Aug. 17, 1943 |

FOREIGN PATENTS

| | | |
|---|---|---|
| 72,569 | Germany | June 13, 1893 |